April 15, 1924.

F. KNUTSON

HARROW

Filed Nov. 23, 1922

1,490,514

WITNESSES

Inventor
FRED KNUTSON
By Richard B. Owen, Attorney

Patented Apr. 15, 1924.

1,490,514

UNITED STATES PATENT OFFICE.

FRED KNUTSON, OF SOUTH BEND, WASHINGTON.

HARROW.

Application filed November 23, 1922. Serial No. 602,822.

*To all whom it may concern:*

Be it known that I, FRED KNUTSON, a citizen of the United States, residing at South Bend, in the county of Pacific and State of Washington, have invented certain new and useful Improvements in a Harrow, of which the following is a specification.

This invention relates to agricultural implements and the primary object of the invention is to provide an improved harrow, which will work effectively on hard packed ground, as well as on soft ground and which embodies a plurality of rotatable teeth for effectively digging and breaking up the soil.

Another object of the invention is to provide a harrow embodying a frame and a plurality of rotatable transverse rollers carrying curved harrow teeth, the teeth being brought into contact with the ground one after the other, during the pulling of the harrow over the ground to be cultivated.

A further object of the invention is to provide a novel arrangement of the teeth on the rollers, whereby the teeth on adjacent rollers will be disposed intermediate each other, the teeth of certain of the rollers being adapted to dig up the ground, while the teeth on certain other rollers being adapted to break up the ground uprooted by the first mentioned teeth.

A still further object of the invention is to provide an improved harrow of the above character, which will be durable and efficient in use, one that will be simple and easy to manufacture, and one which can be placed upon the market at a reasonable cost.

With these and other objects in view the invention consists in the novel construction, arrangement and formation of parts, as will be hereinafter more specifically described, claimed and illustrated in the accompanying drawings, forming a part of this specification, in which drawings:

Figure 1:
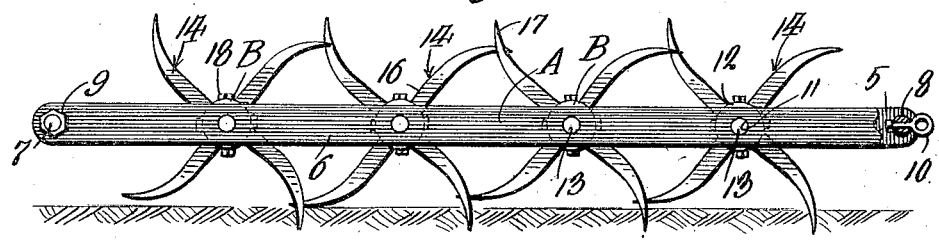
Figure 1 is a side elevation of the improved harrow.
Figure 2:
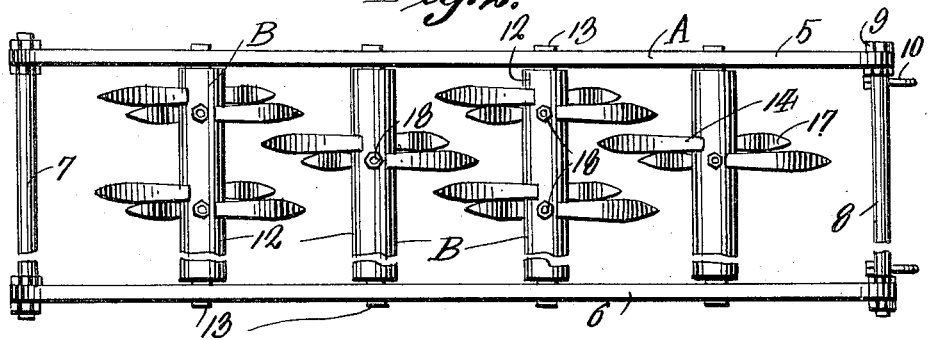
Figure 2 is a top plan view of the same.

Referring to the drawings in detail, wherein similar reference characters designate corresponding parts throughout the several views, the letter A generally indicates the frame of the harrow, which includes a pair of spaced parallel longitudinally extending flat side bars 5 and 6. These side bars 5 and 6 terminate in eyes or in transversely aligned openings for the reception of the transversely extending end rods 7 and 8, which form means for rigidly connecting the side bars 5 and 6 together. The terminals of the rods 7 and 8 are threaded for the reception of inner and outer nuts 9 and these nuts serve as effective means for rigidly holding the bars 5 and 6 in position on the rods. The rod 8 may be considered as the draw bar and is provided with suitable eyes 10 to which the drawing chains (not shown) can be attached.

The side bars 5 and 6 are provided with transversely aligned bearing openings 11, for a purpose, which will be hereinafter more fully described.

The frame A is adapted to support a plurality of rotatable rollers B. As shown, the rollers are four in number, but it is to be understood that more or less rollers may be used, without departing from the spirit or the scope of this invention.

Each roller B includes a cylindrical transversely extending body 12 having its terminals provided with outwardly extending axially disposed trunnions 13 which are adapted to be rotatably mounted within the bearing openings 11.

Each roller B is provided with a plurality of teeth 14. It is preferred to have the second and fourth rollers provided with thirty teeth and the first and second rollers with twenty eight teeth, but it is to be understood that the number of teeth employed may also be varied without departing from the spirit or scope of the invention.

Figure 3:
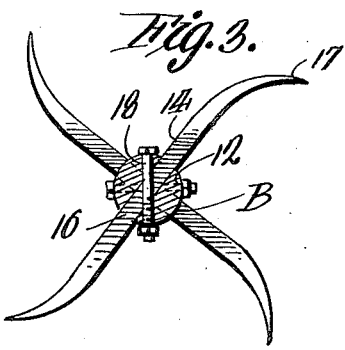
Figure 3 is a detail enlarged transverse section through one of the rollers showing the arrangement of the harrow teeth thereon.

Each tooth includes a straight body portion 16 which is extended diametrically through the rollers and the terminals of the body 16 are bent arcuately in opposite directions to provide oppositely disposed digging portions 17 which are preferably sharpened to facilitate the insertion thereof into the ground. As shown the teeth 14 are arranged in pairs and extend at right angles to each other through the rollers. Bolts 18 are extended diametrically through the rollers for engaging each tooth 14 as can be clearly seen by referring to Figure 3 of the drawings. It is evident that by this construction the displacement of the teeth is precluded.

The teeth however, can be readily removed if so desired, to permit the resharpening thereof by merely removing the bolts 18.

In operation of the improved harrow the same is drawn over the ground by draft animals or a tractor and the teeth will effectively dig into and uproot the ground. The teeth on the rollers are so arranged that the same will be disposed intermediate the teeth of certain other rollers and thus while certain teeth are uprooting the ground the other teeth will serve as means for breaking up the clods of earth uprooted by the first teeth.

It is to be understood of course, that the harrow can be used in sections, that is one or more of the harrows connected together.

Changes in details may be made without departing from the spirit or the scope of this invention but what I claim as new is:

1. A harrow comprising a frame including a pair of spaced parallel longitudinally extending side bars having a plurality of transversely aligned bearing openings therein, transversely extending rods connecting the terminals of the side bars together, nuts adjustably mounted on the rods for engaging the inner and outer faces of the side bars, transversely extending rollers disposed between the side bars, trunnions carried by the terminals of the rollers disposed in said bearing openings in the side bars, and radially extending arcuately curved teeth carried by the rollers.

2. A harrow comprising a frame including a pair of spaced parallel longitudinally extending side bars, transversely extending members connecting the terminals of the side bars together, a plurality of equidistantly spaced rollers disposed transversely of the frame and carried by the longitudinally extending side bars, a plurality of radially extending teeth carried by the rollers, each tooth including a straight body portion, an oppositely direct curved ground engaging terminals, and bolts extending diametrically through the rollers and through said teeth, the bolts extending through the teeth at an angle to the transverse axis thereof, the bolts being disposed between the angle formed by each pair of the teeth.

In testimony whereof I affix my signature in presence of two witnesses.

FRED KNUTSON.

Witnesses:
GEO. J. DEVER,
A. B. McDONALD.